US007726250B2

(12) United States Patent
Duzan, Jr. et al.

(10) Patent No.: US 7,726,250 B2
(45) Date of Patent: Jun. 1, 2010

(54) METHOD OF TIMBERLAND MANAGEMENT

(75) Inventors: Howard W. Duzan, Jr., Columbus, MS (US); George Bledsoe, Hot Springs, AR (US)

(73) Assignee: Weyerhaeuser NR Company, Federal Way, WA (US)

( * ) Notice: Subject to any disclaimer, the term of this patent is extended or adjusted under 35 U.S.C. 154(b) by 1165 days.

(21) Appl. No.: 10/459,920

(22) Filed: Jun. 11, 2003

(65) Prior Publication Data
US 2004/0268428 A1    Dec. 30, 2004

(51) Int. Cl.
*A01G 11/00*     (2006.01)
*A01G 23/02*     (2006.01)
(52) U.S. Cl. .................... 111/100; 111/200; 111/900; 111/906; 111/923
(58) Field of Classification Search .................. 111/100
See application file for complete search history.

(56) References Cited

FOREIGN PATENT DOCUMENTS

| RU | 2070379 C1 | 12/1996 |
|---|---|---|
| SU | 1482-605 A1 | 5/1986 |
| SU | 1491-404 A1 | 7/1989 |
| SU | 1639-509 A1 | 4/1991 |

OTHER PUBLICATIONS

Clason et al. From pine forest to a silvopasture system, Agroforestry Notes, Silvopasture-3, AF Note-18, 2000, pp. 1-4.*
Garrett et al. Walnut Agroforestry, Agricultural publication G5020, 1999, [Online], [retrieved on Jan. 16, 2007]. Retrieved from the Internet <http:web.archive.org/web/20021103231718/http://muextension.missouri.edu/explore/agguid...>pp. 1-5.*
Hatcher et al. Tree crops for marginal farmland black walnut. Virginia Cooperative Extension, Publicaiton No. 446-602, 1998, [online], [retrieved on Jan. 26, 2006]. Retrieved from the Internet <http://www.ext.vt.edu/pubs/forestry/446-602/446-602.html> pp. 1-17.*
Merwin. Intercropping Black Walnut in Oregon's Willamette Valley, The Temerate Agroforester, 1996, pp. 6-8.*
Funk et al. Autumn-olive as a nurse plant for black walnut. Bot. Gaz. 140 (Supp.): S110-S114, 1979.*
Beineke. Black Walnut Plantation Management. Cooperative Extension Service FNR-119, 2002, pp. 1-16.*
Byram et al. Western Gulf Forest Tree Improvement Program Gene Conservaton Plan for Loblolly Pine. Forest Genetic Resources No. 27, 1999, pp. 1-6.*
Whitesell. Effects of spacing on loblolly pine in Hawaii after 11 years. USDA Forest Service Research Note PSW-295, 1974, pp. 1-4.*
Martin J et al, "How to Manage Red Pine," Forestry Facts, *Dept of For Eco, U Wisc*, No. 82, Nov. 1996.
Guo Y et al., "Canopy light transmittance in natural stands of upland sites in Arkansas," *Proc. of 9th Biannual Southern Silviculture Research Conf.* General Technical Report SRS-20:618-622, 1998.

Kneeshaw, D.D., et al.; "Patterns of above- and below-ground response of understory conifer release 6 years after partial cutting"; *Canadian Journal of Forest Research*, vol. 32, No. 2, pp. 255-265, Canada, (Feb. 2002).
Drever, C.R., et al.; "Light-growth responses of coastal Douglas-fir and western redcedar saplings under different regimes of soil moisture and nutrients"; *Canadian Journal of Forest Research*, vol. 31, No. 12, pp. 2124-2133, Canada, (Dec. 2001).
South, D.B., et al.; "Early gains from planting large-diameter seedlings and intensive management are additive for loblolly pine"; *New Forests*, vol. 22, pp. 97-110, Netherlands, (2001).
South, D.B., et al.; "Nursery and site preparation interaction research in the United States", *New Forests*, vol. 22, pp. 43-58, Netherlands, (2001).
South, D.B., et al.; "Herbicides and planting date affect early performance of container-grown and bare-root loblolly pine seedlings in Alabama"; *New Forests*, vol. 1, pp. 17-27, Netherlands, (1986).
Barnett, J.P., et al.; "Performance of container and bareroot loblolly pine seedlings on bottomlands in South Carolina"; *Southern Journal of Applied Forestry*, vol. 17 (2); pp. 80-83, United States, (1993).
Clark III, A., et al.; "Influence of initial planting density, geographic location, and species on juvenile wood formation in southern pine"; *Forest Products Journal*, vol. 39 No. 7/8, pp. 42-48, United States, (Jul./Aug. 1989).
Barnett, J.P.; "Effects of morphological grade on field performance of container-grown southern pine seedlings"; *Paper presented at Sixth Biennial Southern Silvicultural Research Conference*, Memphis, TN, Oct. 30-Nov. 1, 1990.
Boyer, W.D.; "Response of planted longleaf pine bare-root and container stock to site preparation and release: fifth-year results"; *Paper presented at Southern Silvicultural Research Conference*, Memphis, Tennessee, Nov. 1-2, 1988.

(Continued)

*Primary Examiner*—June Hwu
(74) *Attorney, Agent, or Firm*—Christensen O'Connor Johnson Kindness PLLC

(57)    ABSTRACT

A method of managing timberland that utilizes multiple genetic crops. The method comprises planting within a plot of land a first genetic crop in a substantially linear pattern. This first genetic crop is selected for yielding trees with high lumber values. The first genetic crop is planted at a first crop spacing and at a first row spacing that is beneficial to yielding trees with high lumber value. Interplanted along the substantially linear pattern is a second genetic crop. The second genetic crop is selected for yielding trees for other than lumber value. The second genetic crop is planted at a second crop spacing that is shorter than the first crop spacing. Pruning the first genetic crop occurs at a time such that the final value of the first genetic crop will be maximized. Harvesting of the second genetic crop occurs at a time when either the final value of the first genetic crop will be maximized or the final value of the second genetic crop is high. The second genetic crop is harvested at a time when the second genetic crop is about 8 to 14 years old. The first genetic crop is harvested at a time when the first genetic crop is 20 to 30 years old.

23 Claims, 3 Drawing Sheets

OTHER PUBLICATIONS

Williams, H.M. et al.; "Root growth potential and field survival of container loblolly pine seedlings fall fertilized with nitrogen"; *Paper presented at the Eighth Biennial Southern Silvicultural Research Conference,* Auburn, AL, Nov. 1-3, 1994.

Sharma, M., et al; "Spacing rectangularity effect on the growth of loblolly pine plantations". *Can. J. For. Res.* 32:1451-1459 2002.

Amateis, R.L., et al; "The Effect of Spacing Rectangularity on Stem Quality in Loblolly Pine Plantations"; *Report No. 133 Presented at Loblolly Pine Growth and Yield Research Cooperative,* Jun. 2003.

Yanfei, G, et al; "Canopy light transmittance in natural stands on upland sites in Arkansas". *In: Waldrop, Thomas A. (ed.). Proceedings of the ninth biennial southern silvicultural research conference;* Feb. 25-27, 1997.

Henskens, F., et al.; "Physiological basis of spacing effects on tree growth and form in Eucalyptus globulus"; *Trees Structure and Function* 15: 365-377, Heidelberg, Germany 2001.

\* cited by examiner

METHOD OF TIMBERLAND MANAGEMENT

FIELD OF THE INVENTION

This invention generally relates to a method of managing timberland and, more specifically to methods for managing timberland utilizing multiple genetic crops.

BACKGROUND OF THE INVENTION

Many methods are practiced for managing timberland. However, the various methods generally fall into one of two distinct categories of management practices. One category typically is known as plantation management wherein a single tree crop is planted in relatively narrow rows. This process is designed to provide uniform, even-aged regeneration of trees on the land. Typically, the trees are planted with a row spacing of about 8 feet to about 14 feet and are managed to produce between 450 to 750 trees per acre. Alternatively, there is a "shelterwood" method that requires a predetermined number of seed-producing trees be retained per acre to naturally establish a randomly dispersed new crop of seedlings. Both of these common timberland management methods have inherent limitations.

Current plantation management methods have many deficiencies. A one-pass planting process does not generally allow for the successful replanting in areas where trees fail to establish themselves. The relatively high number of trees planted under a plantation type management practice often preclude the use of practices such as high quality genetics and containerized seedlings because they are not financially attractive due to cost. Further, a single tree crop is more susceptible to catastrophic loss due to disease or infestation than is a multiple genetic crop. Finally, the relatively high density of the trees requires thinning at times dictated by the growth of the trees rather than by maximizing economic return.

The "shelterwood" management method also has deficiencies. More specifically, relying on natural regeneration of timberland from selective seed trees yields a random arrangement of trees within a plot. Yearly variation in seed production, weather and quality seed beds greatly affect the success of this technique. Regeneration of uniform density of trees is rarely achieved. Consequently, the use of automated ground equipment is difficult because of the random arrangement of the trees. Likewise, the seed trees are the genetic basis for the new crop of trees. As a result, it is difficult to improve the genetics of the crop beyond the genetics of the initial seed trees.

SUMMARY OF THE INVENTION

The present invention provides a method of managing timberland that utilizes more than one genetic crop of trees. The method comprises planting within a plot of land a first genetic crop in a substantially linear pattern. This first genetic crop is selected for yielding trees with high lumber values. The first genetic crop is planted at a first crop spacing and at a first row spacing that is beneficial to yielding trees with high lumber value. Interplanted along the substantially linear pattern is a second genetic crop. The second genetic crop is selected for yielding trees for other than lumber value. The second genetic crop is planted at a second crop spacing that is shorter than the first crop spacing. Pruning the first genetic crop occurs at a time such that the final value of the first genetic crop will be maximized. Harvesting of the second genetic crop occurs at a time when either the final value of the first genetic crop will be maximized or the value of the second genetic crop is high, typically about the $8^{th}$ to $14^{th}$ year of the second genetic crop. The first genetic crop is harvested at a time when the trees have significant value, typically around the $20^{th}$ to $30^{th}$ year.

BRIEF DESCRIPTION OF THE DRAWINGS

The preferred and alternative embodiments of the present invention are described in detail below with reference to the following drawings.

DETAILED DESCRIPTION OF THE INVENTION

In accordance with the present invention there is provided a method of timberland management that aligns the cost of planting and maintaining a diversified crop with the value of the product received from each respective crop. In a presently preferred embodiment, the crop refers to trees, tree seedlings, rooted cuttings or tree seeds.

Figure 1:
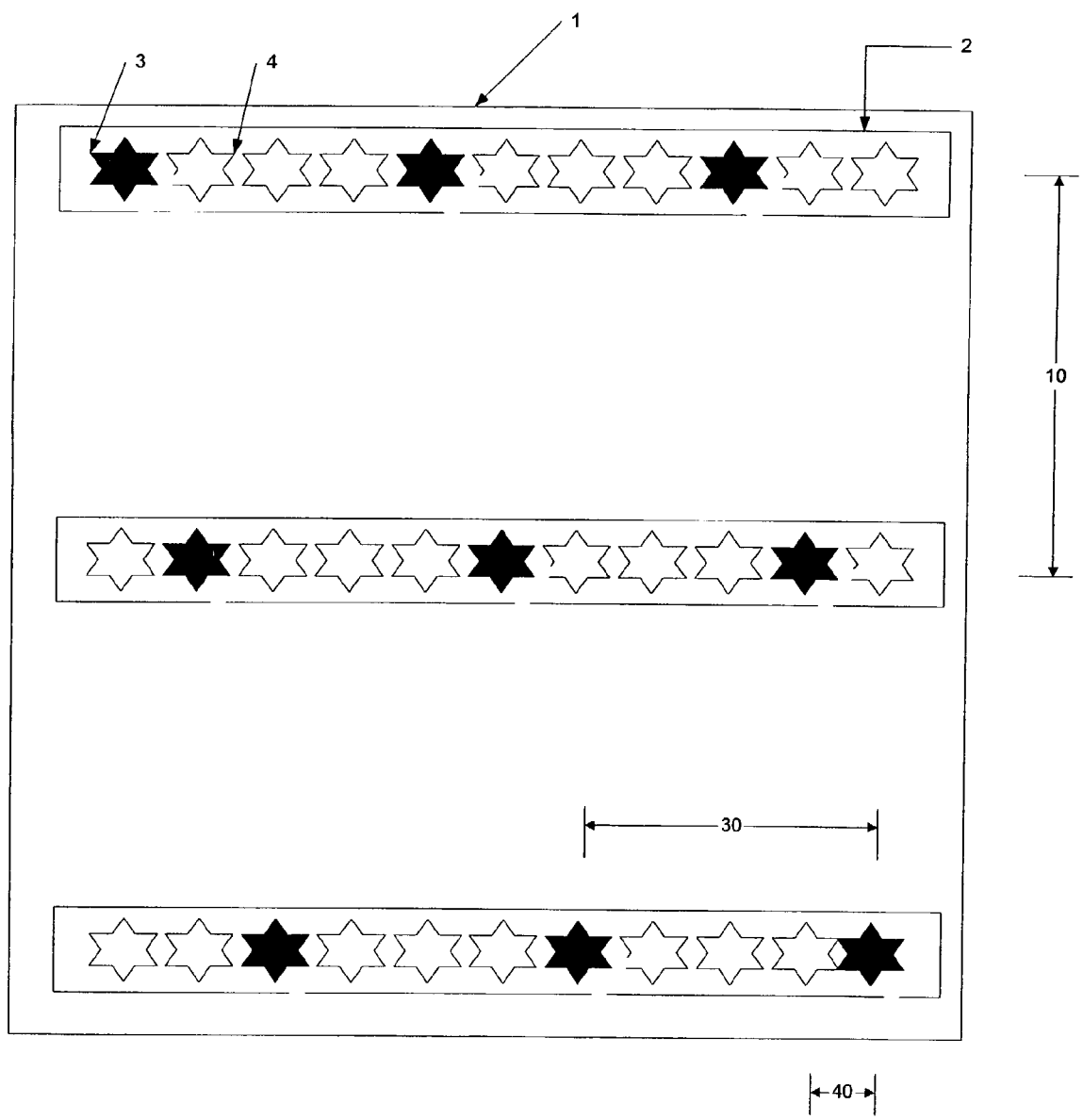
FIG. 1 is a plan view of a plot of land planted in accordance with the present invention.

Referring now to FIG. 1, there is depicted a plan view of a plot of land 1 planted in accordance with the present invention. The plot includes a plurality of substantially linear beds 2 having a pre-determined row spacing 10 therebetween. The specific nature of the bed 2 and the distance for row spacing 10 is dependent upon a variety of factors, such as, without limitation, the type of trees being grown or the nature of products desired from the trees. The row spacing 10 selected should provide ample room for large machinery and equipment to access the trees for the purpose of managing their growth and development without damaging them. Specifically, for fertilizing, thinning, pruning and ultimately harvesting of the crops. In addition, the row spacing 10 should optionally provide sufficient room for a regeneration planting. In a preferred embodiment, the row spacing 10 is about 18 feet to about 22 feet. In a more preferred embodiment, the row spacing 10 is about 20 feet. However, row spacing 10 reasonably above or below these ranges is considered within the scope of this invention if it permits the appropriate management of the timberlands.

Preparation of the bed 2 may be accomplished by any variety of processes, either mechanical, chemical or combination thereof. Non-limiting examples of mechanical bed preparation include sub-soiling, disking, cultivating, harrowing or combinations thereof. Alternatively or additionally, a variety of chemical bed preparation activities may occur, such as, with out limitation, the application of fertilizer, insecticide or herbicide. The fertilizer may be either solid, liquid, gas or combinations thereof. The type and nature of fertilizer used will be dependent upon a variety of factors such as, without limitation, soil conditions and crop requirements. Similarly, the use or type of pesticide or herbicide employed, if at all, will be controlled by similar factors. Useful fertilizers include, but are not limited to, urea, diammonium phosphates and derivatives of each. Useful herbicides include, but are not limited to, imidazolinones and imazapyr such as Arsenal® sold by BASF. Useful pesticides include, but are not limited to, 3-(phenoxyphenyl) methyl (+,−)-cis, trans-3-(2,2-dichloroethenyl)-2,2-dimethyl cyclopropanecarboxylate such as sold by FMC Corporation or ICI America, Inc under the trade names Pounce® or Ambush®.

The plot 1 is planted with trees from at least two different genetic crops, a first genetic crop 3 and a second genetic crop 4. By the term "genetic crop" what is meant is a tree species that exhibits certain defined genetic traits. For instance, a tree with good wood density or straightness for lumber would be desirable whereas a tree with large quantities of fiber that is easily pulpable for pulp or paper would be desirable. Any number of crop species may be used without departing from the spirit and scope of the present invention. For instance, a single species, such as loblolly pine, may be used for both the first genetic crop 3 and the second genetic crop 4, provided there is a difference between them derived from genetic makeup of the two crops. Preferably, at least two tree species are employed in the present invention. By planting multiple genetic crops within the plot 1, forest diversity is achieved while providing a greater genetic diversity to guard against disease or insects.

In general terms, the first genetic crop 3 is a relatively higher value genetic crop. More specifically, the first genetic crop 3 is preferably selected for specific, individual tree traits, or is managed to produce a relatively higher value final product. A primary interest with the first genetic crop 3 is the quality of the individual trees within the genetic crop. More specifically, a first genetic crop 3 may be selected for individual tree traits, such as, without limitation, limb arrangement, grain alignment, wood density, straightness or stiffness. Traits such as these are desirable for lumber. Non-limiting examples of a first genetic crop 3 selected for specific traits are trees, tree seedlings, bareroot seedlings or tree seeds derived from a selective process. The selective process may include selective breeding, clonal propagation or genetic modification. In production, the first genetic crop 3 is typically raised in a nursery or other controlled environment wherein their growing may be easily controlled and manipulated to maximize growing conditions. Often the first genetic crop 3 is a containerized seedling, which is typically grown in racks, either outside or in greenhouses. The use of containers generates higher seed to seedling ratios, better survival and growth, permits the planted crop to retain its root system intact but does come at a significantly higher cost. The containerized seedling may include supplements, such as, without limitation, rooting hormones, to aid in plant establishment or growth. It is preferable to plant the containerized seedling as early as possible to promote root growth well before the active growing season. Examples of relatively higher value final products include, but are not limited to, trees for dimensional lumber, strand lumber, veneer lumber or other trees wherein sections of the tree are used in various other engineered lumber products or other timber products wherein volume and other individual tree characteristics are desired. Additionally, it will be appreciated that other elements or sections of the first genetic crop 3, such as waste material for laminated beams, may be used without departing from the spirit and scope of this invention. Because of the relatively higher value of the first genetic crop 3, it is important that they be identified so as to distinguish them from the lesser value second genetic crop 4.

The second genetic crop 4 is a relatively lower value genetic crop. Generally, the second genetic crop 4 is a genetic crop derived from or managed for a relatively lower value source or product. Typically, the second genetic crop 4 is a crop not being grown for individual tree qualities. Generally, the value of the second genetic crop 4 is derived from the properties of the species as a whole rather than the specific genetic makeup of a bred tree line. Examples of relatively lower value final products include, but are not limited to, trees for pulp, pulp fiber, paper fiber, chips, strands, or thinning-related products wherein the end product is concerned with the fiber or cellulose value of the tree rather than for the lumber value of the tree. Because the second genetic crop 4 is targeted for relatively lower end use, the high cost of containerized seedlings or best genetics tends to be prohibitive. A relatively lower initial production cost would warrant, but is not limited to, a bareroot seedling. By bareroot seedling what is meant is a seedling initially grown in an open nursery from seeds, lifted out of the soil such that the bare roots are substantially free from soil and stored in refrigerated coolers until planted. However, any other relatively lower cost seedling is considered within the scope of this invention. In a presently preferred embodiment, the second genetic crop 4 is the same tree species as the first genetic crop 3.

The method of timberland management preferably uses multiple pass planting. More specifically, a planting pass is used for each genetic crop planted. Thus, the first genetic crop 3 is planted at a first planting pass followed at a later time by interplanting the second genetic crop 4 at a second planting pass. Preferably, the first genetic crop 3 is planted early in the planting season so the relatively higher value first genetic crop 3 has the best chance of survival and early growth. Subsequently, the second planting pass occurs, wherein the second genetic crop 4 is planted. The timing of the second planting pass is dependent upon the nature of the genetic crops planted. Preferably, the second planting pass occurs long enough after to the first planting pass to allow planting of second genetic crops where any first genetic crops failed to establish themselves. However, should methods be developed that allow for simultaneous planting of both first and second genetic crops, this process is considered within the scope of this invention if it permits the appropriate management of the timberlands.

The first genetic crop 3 and the second genetic crop 4 are planted at a predetermined crop spacing within the bed 2, as best seen in FIG. 1. A primary crop spacing 30 refers to the linear distance along the bed 2 between each first genetic crop 3. Conversely, a secondary crop spacing 40 refers to the linear distance along the bed 2 either between each second genetic crop 4 or between the first genetic crop 3 and the second genetic crop 4. In a presently preferred embodiment, the first genetic crop 3 is planted at a primary crop spacing 30 of about 20 feet. However, a primary crop spacing 30 reasonably above or below the preferred primary crop spacing 30 is considered within the scope of this invention. The secondary crop spacing 40 is preferably about 5 feet. However, a secondary crop spacing 40 reasonably above or below the preferred secondary crop spacing 40 is also considered within the scope of this invention. Thus, preferably for every four trees planted, one will be a first genetic crop 3 and three will be second genetic crops 4. On a typical acre of land there would be approximately 450 trees planted comprising 110 planting of first genetic crop 3 and 340 plantings of second genetic crop 4.

Once the crops have been planted, a variety of processes are used to manage the growth and development of the various genetic crops. Non-limiting examples of these processes include, alone or in combination, pruning, thinning or applying any variety of fertilizer, herbicide, or pesticide. These processes may occur any number of times during genetic crop production. The timing of the various processes to manage growth and development is variable and is preferably aligned with crop value. For example, pruning of the first genetic crop 3 preferably occurs at a time when the final value of the first genetic crop 3 may be most improved, or conversely, when the value products derived from the pruning is maximized. By pruning what is meant is the removal of branches to promote the growth of knot-free wood. Pruning is typically done after the first genetic crop 3 reaches a height of approximately 30 feet and then the tree limbs are pruned to a height of between 18 to 21 feet from the ground. Similarly, harvesting of the second genetic crop preferably occurs at a time or times when the value of products derived from the second genetic crop 4 is relatively high, or when the value of the first genetic crop 3 is most improved by harvesting. Harvesting some trees in the plot permits the remaining trees to grow more rapidly. Harvesting is typically done from the 8$^{th}$ to the 14$^{th}$ year after planting. Low density stands that result from pruning and harvesting in accordance with the present invention present less risk to the timberlands from overstocking pressures such as mortality, insect infestation (Southern Pine Beetle) and the like. Additionally, the timing, amount and selection of fertilizers, herbicides or pesticides employed are controlled to maximize value returned from the process. Useful fertilizers include, but are not limited to, urea, diammonium phosphates and derivatives of each. Useful herbicides include, but are not limited to, imidazolinones and imazapyr such as Arsenal® sold by BASF. Useful pesticides include, but are not limited to, 3-(phenoxyphenyl) methyl (+,−)-cis,trans-3-(2,2-dichloroethenyl)-2,2-dimethyl cyclopropanecarboxylate such as sold by FMC Corporation or ICI America, Inc under the trade names Pounce® or Ambush®.

Figure 2:
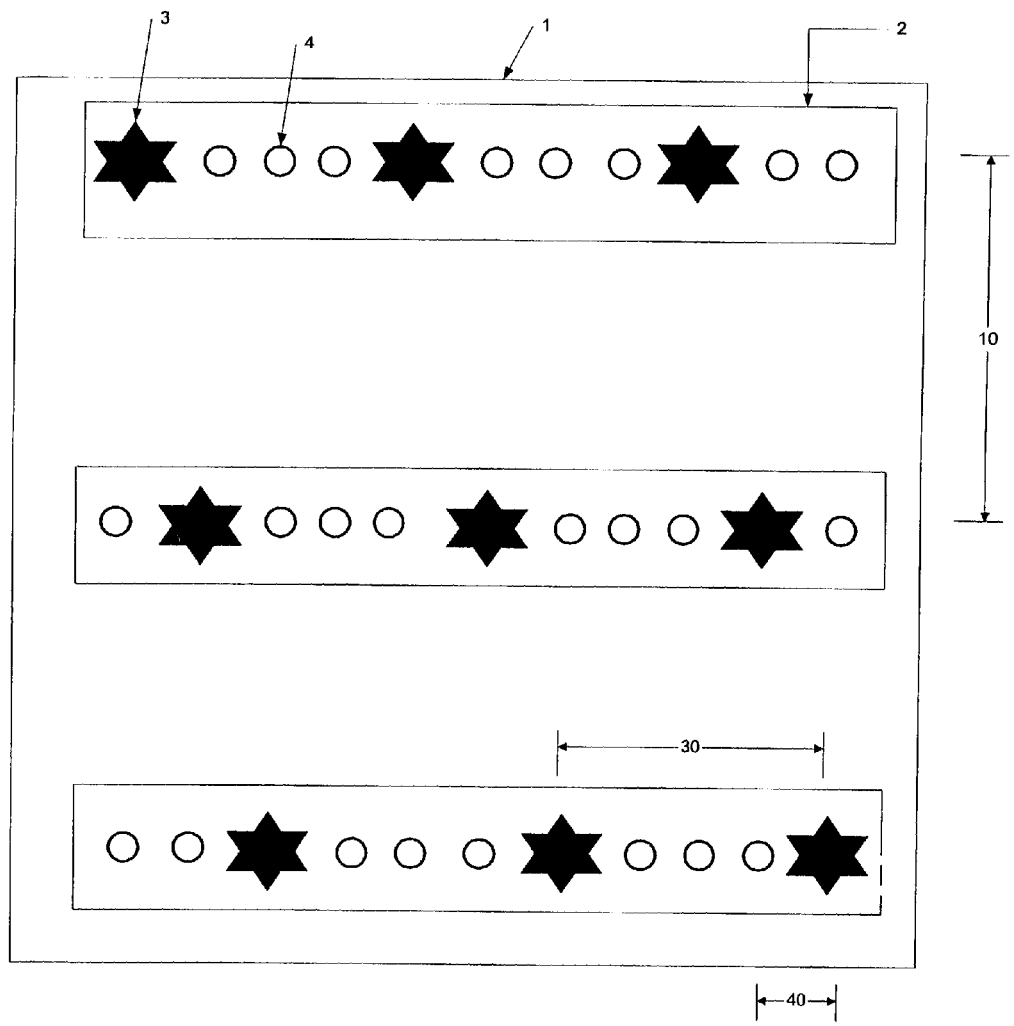
FIG. 2 is a plan view of a plot of land after the second genetic crop has been harvested in accordance the present invention.

FIG. 2 depicts the plot 1 at a time after the second genetic crop 4 has been harvested in accordance the present invention. In an acre of land, that would amount to harvesting approximately 340 of the original 450 trees, all of them, or a high proportion of them, being second genetic crop 4. This allows the remaining first genetic crops 3 to have increased sunlight and potential for growth.

In view of the fact that the value of timberlands is related to how fast the land can generate trees, forest regeneration is vitally important to the forest industry. In addition, because the amount of time necessary to grow a tree is substantially longer than many other harvested crops, forest companies often face societal pressures against clear cutting due to the visual aesthetics of the landscape during the initial phases after harvesting the trees. In particular, roadsides, adjacent landowners and vistas may appear to the uninitiated to be unsightly during the initial re-growth. Accordingly, the present invention optionally provides a regeneration process with the other elements of the method of managing timberlands. This regeneration process assists in sustaining crop production and in improving forest genetics and age diversity. The regeneration process involves a partial harvesting approximately 2 to 4 years prior to the final harvest where all but ten to twenty of the first genetic crop 3 trees are harvested per acre. This allows sufficient light to enable a new planting to be established. The new planting utilizes substantially linear beds 22 located midway between the initial beds 2. In all other regards the regeneration planting is substantially the same as the initial planting. Not only does this improve the visual aesthetics of the land, but also it provides for continuity in wildlife habitat and is added protection against soil erosion.

Figure 3:
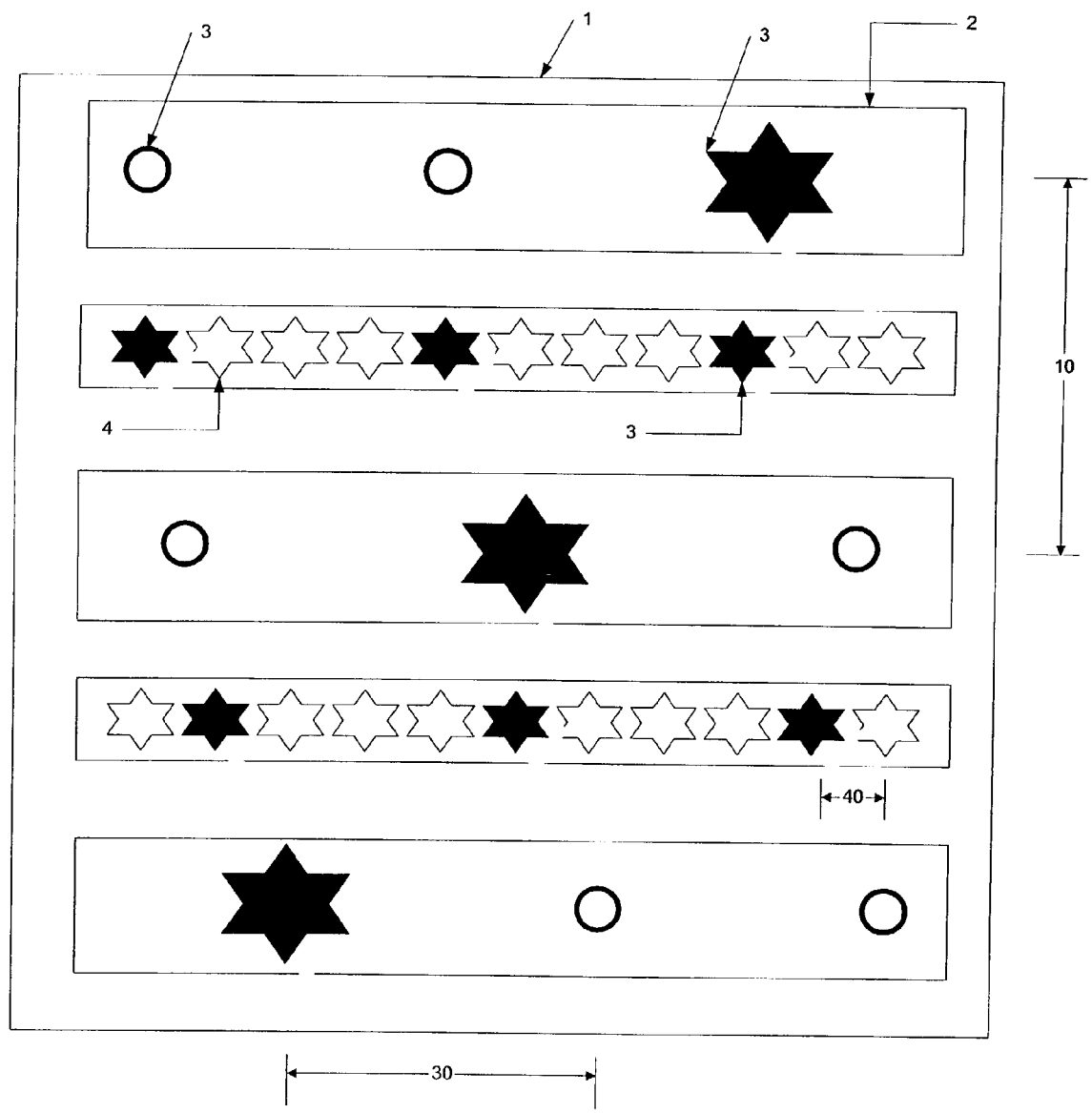
FIG. 3 is a plan view of a plot of land planted for regeneration after the first genetic crop has been partially harvested in accordance the present invention.

FIG. 3 depicts plot 1 at a time after the first genetic crop 4 has been partially harvested where the regeneration process section includes an underplanting of a first genetic crop 3 and a second genetic crop 4 prior to the harvesting of the remaining original first genetic crop 3.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of managing timberland comprising:
   (a) planting within a plot a first genetic tree crop of a first tree species that is selected for at least a first tree trait in a substantially linear pattern defining a first plurality of adjacent substantially linear beds at a first crop spacing and at a first row spacing between adjacent substantially linear beds, the first genetic tree crop selected for yielding trees with high lumber values, wherein the first row spacing is 18 to 22 feet;
   (b) interplanting a second genetic tree crop of the first tree species that is selected for at least a second tree trait different from the first tree trait in the first plurality of adjacent substantially linear beds at a second crop spacing that is shorter than the first crop spacing, such that adjacent substantially linear beds include trees of the first and second genetic tree crops, the second genetic tree crop selected for yielding trees for fiber or cellulose value;
   (c) pruning the first genetic tree crop at a time such that the final value of the first genetic tree crop will be maximized;
   (d) harvesting the second genetic tree crop at a time when either (i) the final value of the first genetic tree crop will be maximized or (ii) the value of the second genetic tree crop is high; and
   (e) either: (i) fully harvesting the first genetic tree crop and optionally, repeating steps (a) through (e), or (ii) partially harvesting the first genetic tree crop thereby leaving a remnant of the first genetic tree crop and optionally planting a first genetic tree crop in a second plurality of substantially linear beds at a first crop spacing, wherein the second plurality of substantially linear beds are planted approximately midway between the first row spacing within the plot, and interplanting a second genetic tree crop in the second plurality of substantially linear beds at a second crop spacing that is shorter than the first crop spacing, wherein adjacent substantially linear beds include trees of the first and second genetic tree crops, and thereafter repeating steps (c) through (e).

2. The method of claim 1, further comprising preparing a bed for receipt of the first genetic tree crop and the second genetic tree crop.

3. The method of claim 2, wherein preparing a bed includes at least one of a mechanical soil preparation or a chemical soil preparation.

4. The method of claim 1, further comprising controlling development of the first genetic tree crop and the second genetic tree crop by periodic fertilization.

5. The method of claim 1, wherein the first crop spacing between each first genetic tree crop planting in the first plurality of substantially linear beds is approximately 20 feet.

6. The method of claim 1, wherein the second crop spacing between each second genetic tree crop planting in the first plurality of substantially linear beds is approximately 5 feet.

7. The method of claim 1, wherein the second genetic tree crop is harvested when the crop is approximately 8 to 14 years old.

8. The method of claim 1, wherein the first genetic tree crop is harvested when the crop is approximately 20 to 30 years old.

9. The method of claim 1, wherein the first genetic tree crop is pruned after the crop reaches an average height of approximately 30 feet and the tree limbs are pruned to a height between 18 to 21 feet above the ground.

10. A method of managing timberland, comprising:
(a) planting within a plot a first genetic tree crop of a first tree species that is selected for at least a first tree trait in a substantially linear pattern defining a plurality of adjacent substantially linear beds at a first crop spacing and at a predetermined row spacing, the first genetic tree crop selected for yielding trees with high lumber values;
(b) interplanting a second genetic tree crop of the first tree species that is selected for at least a second tree trait in the plurality of adjacent substantially linear beds at a second crop spacing that is shorter than the first crop spacing, the second genetic tree crop selected for yielding trees for fiber or cellulose value, wherein adjacent substantially linear beds include trees of the first and second genetic tree crops;
(c) pruning the first genetic tree crop at a time such that the final value of the first genetic tree crop will be maximized;
(d) harvesting the second genetic tree crop at a time when either (i) the final value of the first genetic tree crop will be maximized or (ii) the value of the second genetic tree crop is high; and
(e) partially harvesting the first genetic tree crop.

11. The method of claim 10, further comprising preparing a bed for receipt of the first genetic tree crop and the second genetic tree crop.

12. The method of claim 10, wherein preparing a bed includes at least one of a mechanical soil preparation or a chemical soil preparation.

13. The method of claim 10, further comprising controlling development of the first genetic tree crop and the second genetic tree crop by periodic fertilization.

14. The method of claim 10, wherein the spacing between each first genetic tree crop planting is approximately 20 feet.

15. The method of claim 10, wherein the predetermined row spacing is approximately 18 feet to about 20 feet.

16. The method of claim 10, wherein the second crop spacing between each second genetic tree crop planting in the plurality of adjacent substantially linear beds is approximately 5 feet.

17. The method of claim 10, wherein the second genetic tree crop is harvested when the crop is approximately 8 to 14 years old.

18. The method of claim 10, wherein the first genetic tree crop is harvested when the crop is approximately 20 to 30 years old.

19. The method of claim 10, wherein the first genetic tree crop is pruned after the crop reaches an average height of approximately 30 feet and the tree limbs are pruned to a height between 18 to 21 feet above the ground.

20. A method of managing timberland comprising:
(a) planting within a plot a first genetic tree crop in a substantially linear pattern defining a first plurality of adjacent substantially linear beds in substantially parallel rows at a first crop spacing and at a first row spacing, wherein the first row spacing is selected to allow access of management equipment and machinery, the first genetic tree crop being a first genetic tree crop of loblolly pine selected for yielding trees with high lumber values, wherein a selection trait for the first genetic tree crop is one chosen from the group consisting of limb arrangement, grain alignment, wood density, straightness, and stiffness;
(b) interplanting a second genetic tree crop along the substantially linear pattern in the first plurality of adjacent substantially linear beds at a second crop spacing that is shorter than the first crop spacing, the second genetic tree crop being a second genetic tree crop of loblolly pine different from the first genetic tree crop selected for yielding trees for other than lumber value, wherein adjacent substantially linear beds include trees of the first and second genetic tree crops;
(c) pruning the first genetic tree crop at a time such that the final value of the first genetic tree crop will be maximized;
(d) harvesting the second genetic tree crop at a time when either (i) the final value of the first genetic tree crop will be maximized or (ii) the value of the second genetic tree crop is high; and
(e) either: (i) fully harvesting the first genetic tree crop and optionally, repeating steps (a) through (e), or (ii) partially harvesting the first genetic tree crop thereby leaving a remnant of the first genetic tree crop and optionally planting a first genetic tree crop in a second plurality of substantially linear beds at the first crop spacing in substantially parallel rows approximately midway between the first row spacing of the first plurality of adjacent substantially linear beds within the plot, and interplanting a second genetic tree crop in the second plurality of substantially linear pattern beds at a second crop spacing that is shorter than the first crop spacing and thereafter repeating steps (c) through (e).

21. A method of managing timberland comprising:
(a) planting within a plot a first genetic tree crop in a substantially linear pattern including first and second adjacent substantially linear beds at a first crop spacing and at a first row spacing between the first and second substantially linear beds, wherein the first row spacing is 18 to 22 feet, and the first genetic tree crop being a first genetic tree crop of loblolly pine selected for yielding trees with high lumber values, wherein the selection process is one chosen from the group consisting of selective breeding, clonal propagation, and genetic modification;
(b) interplanting a second genetic tree crop along the substantially linear pattern in the at least first and second adjacent substantially linear beds at a second crop spacing that is shorter than the first crop spacing, wherein the first and second adjacent substantially linear beds include trees of the first and second genetic tree crops, the second genetic tree crop being a second genetic tree crop of loblolly pine different from the first genetic tree crop selected for yielding trees for other than lumber value;
(c) pruning the first genetic tree crop at a time such that the final value of the first genetic tree crop will be maximized;
(d) harvesting the second genetic tree crop at a time when either (i) the final value of the first genetic tree crop will be maximized or (ii) the value of the second genetic tree crop is high; and
(e) either: (i) fully harvesting the first genetic tree crop and optionally, repeating steps (a) through (e), or (ii) partially harvesting the first genetic tree crop thereby leaving a remnant of the first genetic tree crop and optionally planting a first genetic tree crop in a third substantially linear bed at a first crop spacing in rows approximately midway between the first row spacing of the first and second substantially linear beds within the plot and interplanting a second genetic tree crop in the third substantially linear bed at a second crop spacing that is shorter than the first crop spacing and thereafter repeating steps (c) through (e).

22. The method of claim 1, wherein the first tree trait is one chosen from the group consisting of limb arrangement, grain alignment, wood density, straightness, and stiffness.

23. The method of claim 1, wherein the selection process for tree trait selection is one chosen from the group consisting of selective breeding, clonal propagation, and genetic modification.

* * * * *